(12) United States Patent
Ramirez Llanos et al.

(10) Patent No.: US 12,151,704 B2
(45) Date of Patent: Nov. 26, 2024

(54) AUTONOMOUS VEHICLE TRAILER HITCH COUPLING SYSTEM

(71) Applicants: Eduardo Jose Ramirez Llanos, Rochester, MI (US); Julien Ip, Royal Oak, MI (US)

(72) Inventors: Eduardo Jose Ramirez Llanos, Rochester, MI (US); Julien Ip, Royal Oak, MI (US)

(73) Assignee: Continental Autonomous Mobility US, LLC, Auburn Hills, MI (US)

(*) Notice: Subject to any disclaimer, the term of this patent is extended or adjusted under 35 U.S.C. 154(b) by 87 days.

(21) Appl. No.: 17/645,578

(22) Filed: Dec. 22, 2021

(65) Prior Publication Data

US 2023/0192122 A1 Jun. 22, 2023

(51) Int. Cl.
*B60W 60/00* (2020.01)
*G06V 20/58* (2022.01)

(52) U.S. Cl.
CPC ........... *B60W 60/001* (2020.02); *G06V 20/58* (2022.01); *B60W 2300/14* (2013.01); *B60W 2420/403* (2013.01)

(58) Field of Classification Search
CPC ........... B60W 60/001; B60W 2300/14; B60W 2422/90; B60W 2530/203; B60W 2420/403; B60W 2420/42; B60W 2554/80; B60W 2554/801; B60W 2554/802; B60W 2754/10; B60W 2754/20; B60W 2754/30; G06V 20/56; G06V 20/58; G06V 20/647; G06T 7/11; G06T 7/194; G06T 7/70; G06T 7/75; G06T 2207/10028; G06T 2207/30252; B60G 2204/22; B60G 2300/044; B60R 2300/307; B60R 2300/808
See application file for complete search history.

(56) References Cited

U.S. PATENT DOCUMENTS

| | | | |
|---|---|---|---|
| 10,155,478 B2 * | 12/2018 | Hu | G06T 7/74 |
| 10,744,943 B1 | 8/2020 | Jales Costa et al. | |
| 2014/0125795 A1 * | 5/2014 | Yerke | B60R 1/00 348/118 |
| 2019/0084479 A1 | 3/2019 | Zhang et al. | |
| 2019/0258874 A1 * | 8/2019 | Zhang | G06V 10/764 |
| 2019/0337343 A1 | 11/2019 | Ramirez Llanos et al. | |
| 2019/0339708 A1 | 11/2019 | Ramirez Llanos | |
| 2019/0340787 A1 | 11/2019 | Ramirez Llanos | |
| 2019/0346856 A1 * | 11/2019 | Berkemeier | G06V 20/56 |
| 2020/0055356 A1 * | 2/2020 | Niewiadomski | B60R 1/00 |
| 2020/0175311 A1 * | 6/2020 | Xu | B60D 1/62 |
| 2022/0055430 A1 * | 2/2022 | Delizo | B62D 15/0285 |

OTHER PUBLICATIONS

International Search Report and Written Opinion dated Apr. 5, 2023 of counterpart International Application PCT/US2022/082193.

* cited by examiner

*Primary Examiner* — Russell Frejd
*Assistant Examiner* — Brandon Z Willis

(57) ABSTRACT

A method and system for locating and tracking a trailer coupler for autonomous vehicle operation is disclosed. The system converts an image from a vehicle camera to a depth map that includes a plurality of points indicative of a distance between an object within the image and a reference point. The system used the depth map to identify and track a coupler of a trailer.

17 Claims, 4 Drawing Sheets

AUTONOMOUS VEHICLE TRAILER HITCH COUPLING SYSTEM

TECHNICAL FIELD

The present disclosure relates to method and system for identifying and tracking a trailer hitch coupler to enable autonomous and/or semi-autonomous coupling.

BACKGROUND

Autonomously operated or assisted vehicles utilize maps to define a vehicle path. Autonomous operation aids or completely substitutes actions required by a driver and is particularly advantages for vehicle maneuvers that are challenging for drivers, such as for example parallel parking and aligning a trailer hitch coupler. Current vehicles produce large amounts of information from a wide array of sensor systems. Efficient processing of useful information can be challenging. Automotive suppliers and manufactures continually seek improvements that increase customer satisfaction and vehicle operation.

The background description provided herein is for the purpose of generally presenting a context of this disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A method of locating and tracking a trailer coupler for autonomous vehicle operation, the method according to a disclosed exemplary embodiment includes, among other possible things, converting an image from a vehicle camera to a depth map, wherein the depth map includes a plurality of points indicative of a distance between an object within the image and a reference point, identify a coupler of a trailer as points in the revised depth map that are closest to the reference point, and communicating the position of the identified coupler to a vehicle driving control system.

Another exemplary embodiment of the foregoing method further comprises selecting a region of interest in an image from the vehicle camera and creating the depth map objects within the selected region of interest.

In another exemplary embodiment of any of the foregoing methods, the region of interest is smaller than the image from the vehicle camera and includes the trailer coupler.

In another exemplary embodiment of any of the foregoing methods, the region of interest is selected automatically by an algorithm executed by a controller within the vehicle.

Another exemplary embodiment of any of the foregoing methods further comprises removing points in the depth map that are indicative of the ground from the depth map.

Another exemplary embodiment of any of the foregoing methods further comprises determining a path toward the coupler based on the depth map.

Another exemplary embodiment of any of the foregoing methods further comprises determining a pose of the camera based on information from at least one sensor system within the vehicle that are indicative of movement of the vehicle.

Another exemplary embodiment of any of the foregoing methods further comprises generating a dynamical model of vehicle movement based on information from at least one sensors system of the vehicle and determining the pose of the camera based on the dynamical model.

In another exemplary embodiment of any of the foregoing methods, the at least one sensor system comprises at least one of an acceleration sensor, a wheel angle sensor, an inertial measurement unit, or a global positioning system.

In another exemplary embodiment of any of the foregoing methods, the vehicle camera comprises a mono-camera.

Another exemplary embodiment of any of the foregoing methods further comprises creating the depth map in real time with a controller within the vehicle.

Another exemplary embodiment of any of the foregoing methods further comprises identifying the trailer coupler as the object that is associated with points in the depth map that represent a shortest distance to the vehicle.

An autonomous vehicle system for locating and tracking a trailer coupler according to another exemplary embodiment includes, among other possible things, a controller configured to convert an image from a vehicle camera to a depth map, wherein the depth map includes a plurality of points indicative of a distance between an object within the image and a reference point, identify a coupler of a trailer as points in depth map that are closest to the reference point, and communicate the position of the identified coupler to a vehicle driving control system.

In another embodiment of the foregoing autonomous vehicle system, the controller is further configured to remove points indicative of the ground from the depth map.

Another embodiment of any of the foregoing autonomous vehicle systems further comprises selecting means for selecting a region of interest in an image from the vehicle camera.

Another embodiment of any of the foregoing autonomous vehicle systems further comprises at least one sensor system of the vehicle and the controller is further configured to determine a pose of the camera based on information indicative of vehicle odometry provided by the at least one sensor system.

Another embodiment of any of the foregoing autonomous vehicle systems further comprises a path generation system in communication with the controller, the path generation system creating a path for the vehicle toward the coupler.

In another embodiment of any of the foregoing autonomous vehicle systems, the controller is further configured to identify the coupler as the object corresponding to points in the depth map that represent a shortest distance to the vehicle.

A computer readable medium comprising instructions executable by a controller for locating and tracking a trailer coupler, the instructions according to another disclosed exemplary embodiment includes, among other possible things, instructions prompting a controller to convert an image from a vehicle camera to a depth map, wherein the depth map includes a plurality of points indicative of a distance between an object within the image and a reference point, instructions prompting the controller to identify a coupler of a trailer as points in the depth map that are closest to the reference point, and instructions prompting the controller to identify coupler and communicating the position of the identified coupler to a vehicle driving control system.

Another embodiment of the foregoing computer readable medium further comprises instructions for selecting a region of interest within an image from the vehicle camera and creating the depth map of objects within the selected region.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
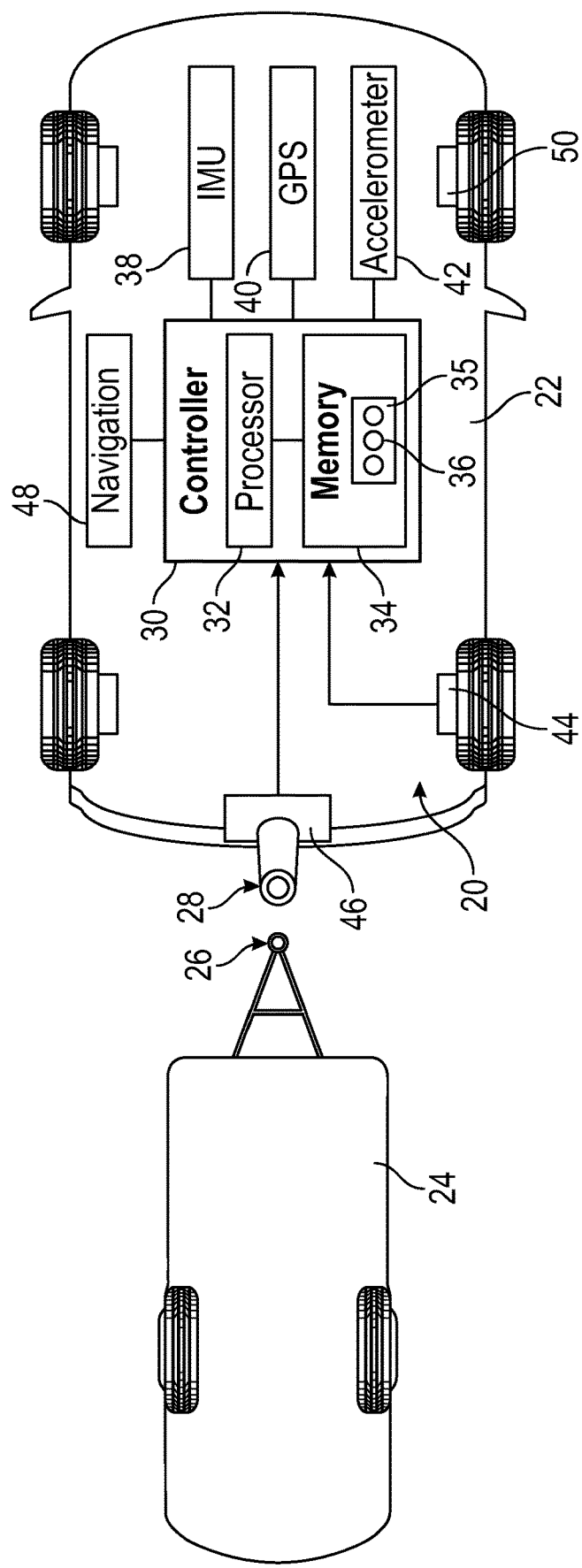
FIG. 1 is a schematic view of a vehicle including a system for aligning a hitch with a coupler.

Referring to FIG. 1, a vehicle 22 and trailer 24 are schematically shown. The vehicle includes a system 20 for identifying and tracking a coupler 26 of the trailer such that the vehicle 22 may align a hitch 28 with the coupler 26. The example system 20 utilizes images generated from a camera 46 and vehicle odometry to identify and track a relative orientation between the vehicle 22 and the trailer 24 to enable the coupling operation.

The example vehicle 22 includes a controller 30 with a processor 32 and a memory device 34. The memory device 34 stores a software instructions 36 that prompt the processor 32 to perform functions that enable the system 22 identify and track a coupler 26 of a trailer 24. The instructions 36 may be stored on a computer readable medium 35.

The example controller 30 may be a separate controller dedicated to the control system 20 are may be part of an overall vehicle controller. Accordingly, example controller 30 relates to a device and system for performing necessary computing and/or calculation operations of the control system 20. The controller 30 may be specially constructed for operation of the control system 20, or it may comprise at least a general-purpose computer selectively activated or reconfigured by software instructions 36 stored in the memory device 34. The computing system can also consist of a network of (different) processors.

The instructions 36 for configuring and operating the controller 30, the control system 20 and the processor 32 are embodied in the software instructions 36 that may be stored on a computer readable medium 35. The computer readable medium 35 may be embodied in structures such as, but is not limited to, any type of disk including floppy disks, optical disks, CD-ROMs, magnetic-optical disks, read-only memories (ROMs), random access memories (RAMS), EPROMs, EEPROMs, magnetic optical cards, application specific integrated circuits (ASICs), or any type of media suitable for storing electronic instructions, and each coupled to a computer system bus. The disclosed computer readable medium may be a non-transitory medium such as those examples provided.

Moreover, the software instructions 36 may be saved in the memory device 34. The disclosed memory device 34, may include any one or combination of volatile memory elements (e.g., random access memory (RAM, such as DRAM, SRAM, SDRAM, VRAM, etc.) and/or nonvolatile memory elements (e.g., ROM, hard drive, tape, CD-ROM, etc.). The software instructions 36 in the memory device 34 may include one or more separate programs, each of which includes an ordered listing of executable instructions for implementing logical functions. The disclosed controller 30 is configured to execute the software instructions 36 stored within the memory device 34, to communicate data to and from the memory device 34, and to generally control operations pursuant to the software. Software in memory, in whole or in part, is read by the processor 32, perhaps buffered within the processor, and then executed.

The system 20 utilizes information from sensors mounted within the vehicle 22 to determine vehicle odometry. In one disclosed example embodiment, the sensors include an inertial measurement unit (IMU) 38, a global positioning system (GPS) 40, an accelerometer 42, wheel speed sensors 44, and wheel angle sensors 50. It should be appreciated that although several sensor systems are disclosed by way of example, other sensor systems that provide information indicative of environments surrounding a vehicle 22 could be utilized and are within the scope of this disclosure.

Autonomous features of vehicles 22 are provided to aid operators in performing difficult vehicle maneuvers and operations. One such maneuver is aligning the hitch 28 with the coupler of the trailer 24. The example system 20 utilizes information obtained from the camera 46 and information indicative of vehicle odometry, to identify and track the trailer coupling 26. Tracking of the coupler 26 within the images is then utilized by the navigation system 48 of the vehicle 22 to plot a tap that aligns the coupler 26 and hitch 28. It should be appreciated that although one camera 46 is disclosed by way of example, that more cameras orientated around the vehicle could be utilized and are within the scope and contemplation of this disclosure. The example camera 46 is a mono-camera 46, but other camera configurations could be used within the scope and contemplation of this disclosure.

Figure 2:
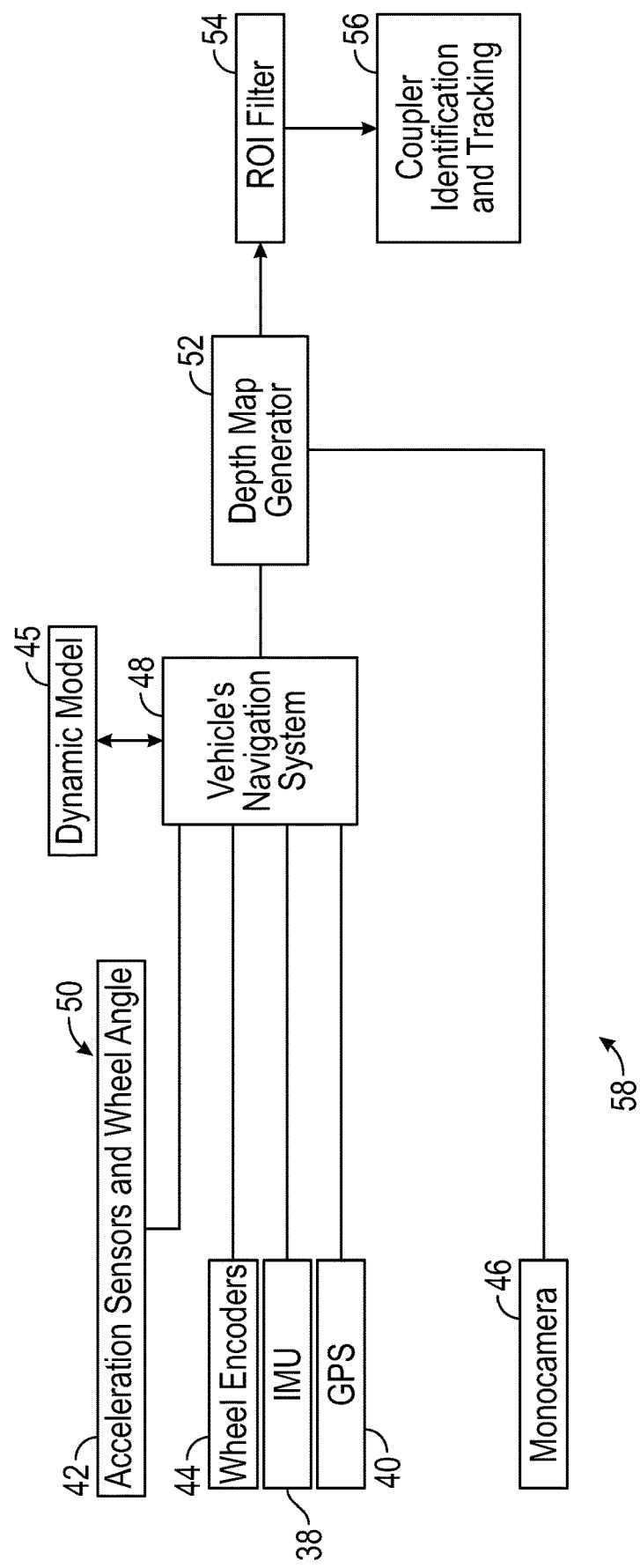
FIG. 2 is a flow diagram illustrating an example process for identifying and tracking a trailer coupling.

Referring to FIG. 2 with continued reference to FIG. 1, the example system accumulates information indicative of vehicle operation from the example vehicle sensor systems 38, 40, 42, 44 and 50. The information obtained by each of these sensor systems is accumulated within a vehicle navigation system 48. The vehicle navigation system 48 output information indicative of vehicle odometry.

The information indicative of vehicle odometry may be generated by a dynamic model 45 of vehicle operation. The vehicle dynamic model 45 provides information indicative of vehicle movement. The dynamic model 45 may be a separate algorithm executed by the controller 30 according to software instructions 36 saved in the memory device 34.

Information from the camera 46 and the navigation system 48 is provided to a depth map generator 52. The example depth map generator 52 is a portion of the controller 30 that operates to define and generate a depth map from images captured by the camera 46. The depth map generator 52 are embodied in the controller 30 as software instructions that are performed by the processor 32. The memory device 34 includes various instructions 36 that prompt the processor 32 to create a depth map based on information provided by the navigation system 48 and the camera 46.

The maps referred to in this example disclosure are not necessarily generated for viewing by a vehicle operator. Instead, each of the disclosed maps are generated for use by the control system 20 to provide for navigation of a vehicle through an environment autonomously and/or semi-autonomously. The maps are therefore generated to provide a means of organizing data associated with locations within an environment surrounding the vehicle 22. Moreover, each of the maps described in this disclosure describe an organization of information and relationships between the organized information indicative of the environment surrounding the vehicle.

Figure 3:
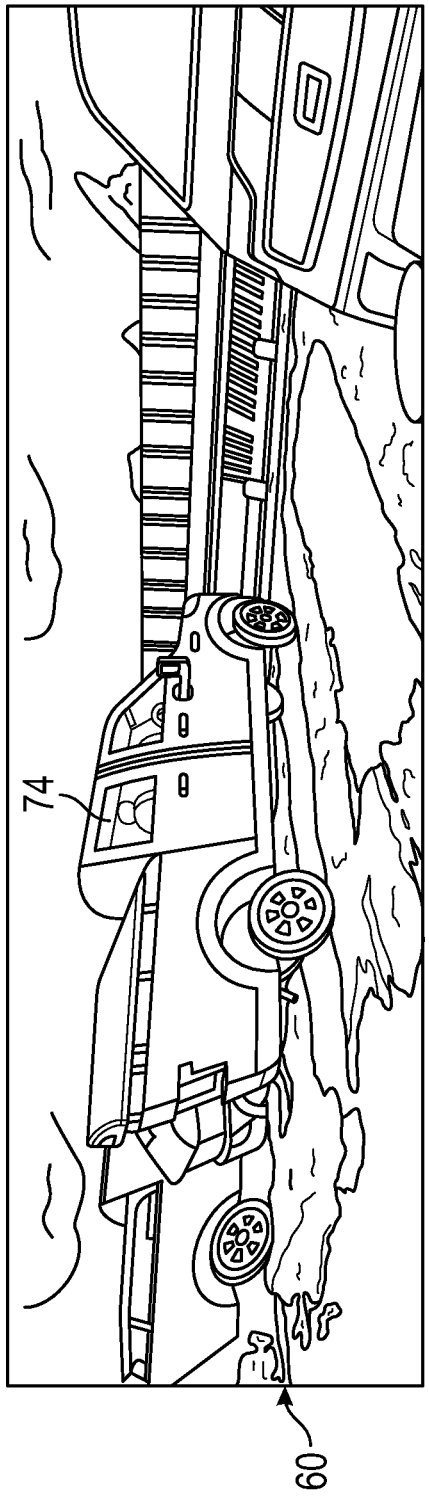
FIG. 3 is an example image captured by a camera mounted on the vehicle.
Figure 4:
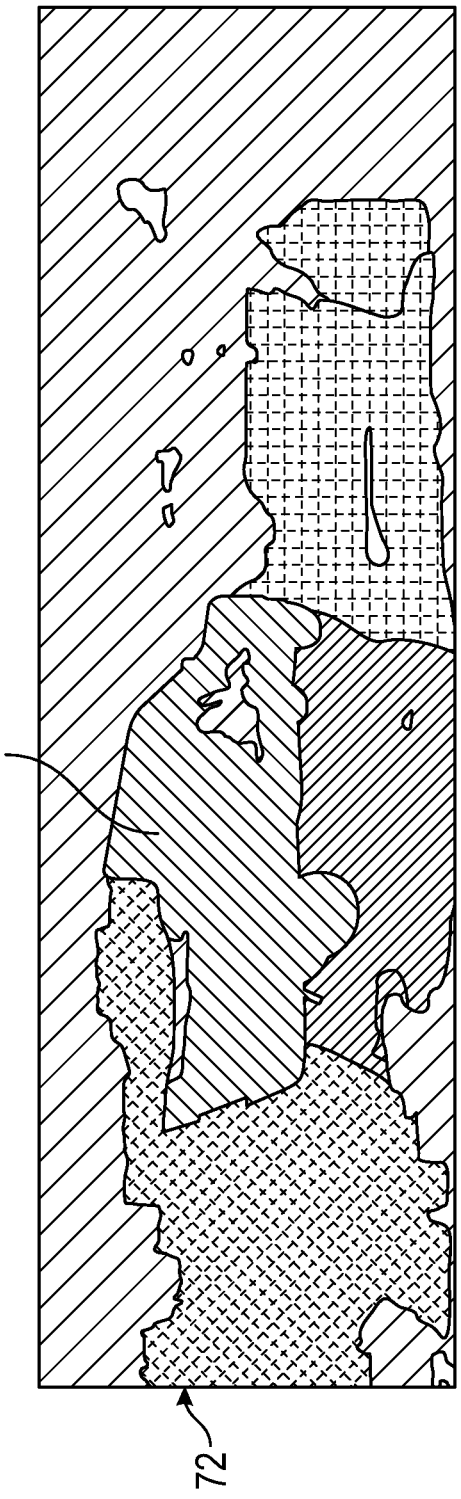
FIG. 4 is an example depth map of objects around the vehicle.

Referring to FIGS. 3 and 4, with continued reference to FIG. 2, the depth map generator 52 takes an image 60 (FIG. 3) generated by the camera 46 and converts that image into a depth map as is indicated at 72 in FIG. 4. A depth map converts objects such as the vehicles indicated at 74 and the image 60 to a plurality of points that are indicative of distance between the camera 46 and the vehicle. In this example, the vehicle 74 is represented by a series of substantially identical points of a common color. Each of the colors represent a different distance from the vehicle 22 and the object 74.

It should be appreciated that a pose of the camera 46 on the vehicle 22 is determined and used in the creation of the depth map 72. The pose of the camera 46 is the position and orientation relative to an origin of a coordinate system that may be set using the initial pose of the camera in the surrounding environment. The position and orientation of the vehicle, or vehicle's pose, is understood such that a relative position between the vehicle and the origin of the coordinate system. It may be determined with the knowledge of the pose of the camera, that is the location of the camera 46 and the specific orientation of the image 60.

Figure 5:
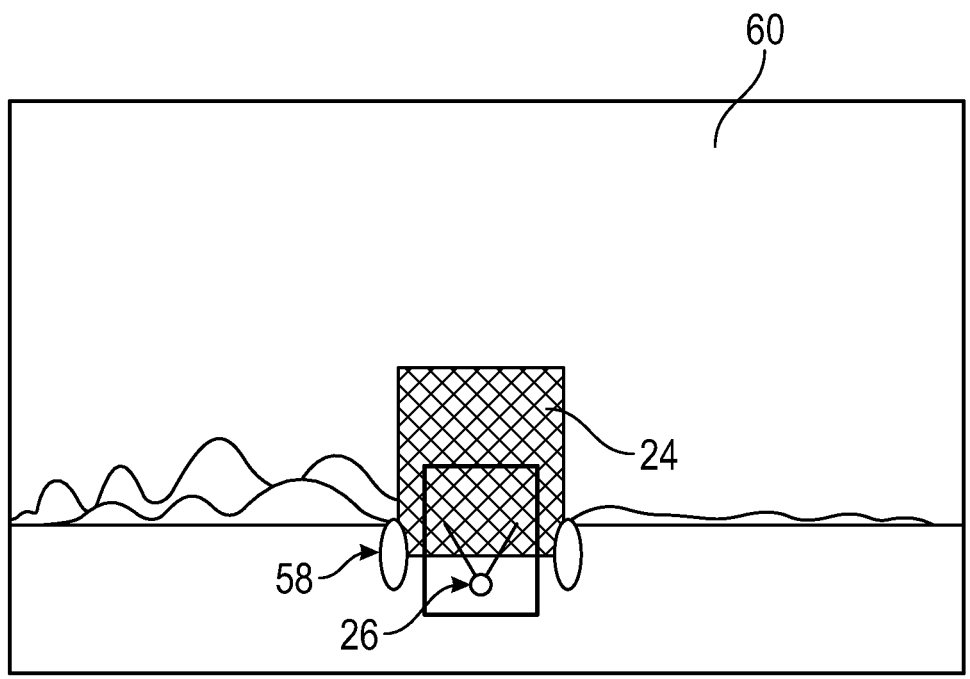
FIG. 5 is a schematic view of an example region of interest including a trailer coupling.

Referring to FIG. 5, with continued reference to FIGS. 2-4, a region of interest (ROI) filter 54 selects a space 58 within the depth map 72 where the coupler 26 is located. The region of interest filter 54 is used to specific a region within the image 60 from which the coupler 26 is identified and tracked as indicated at 56. Areas outside the region of interest 58 will be disregarded.

The example region of interest 58 is a square shaped space defined around the object of interest, in this example embodiment, the trailer coupler 26. The box 58 may be selected automatically by a separate algorithm performed by the controller 30 or may be selected manually by an operator within the vehicle 22.

It should also be appreciated that although the example region of interest 58 is square, other shapes such as circles may be utilized and are within the contemplation scope of this disclosure.

Objects within the selected region of interest 58 are analyzed to identify the coupling 26. The coupling 26 is identified as the feature(s) within the region of interest 58 that are closest to the camera 46.

Figure 6:
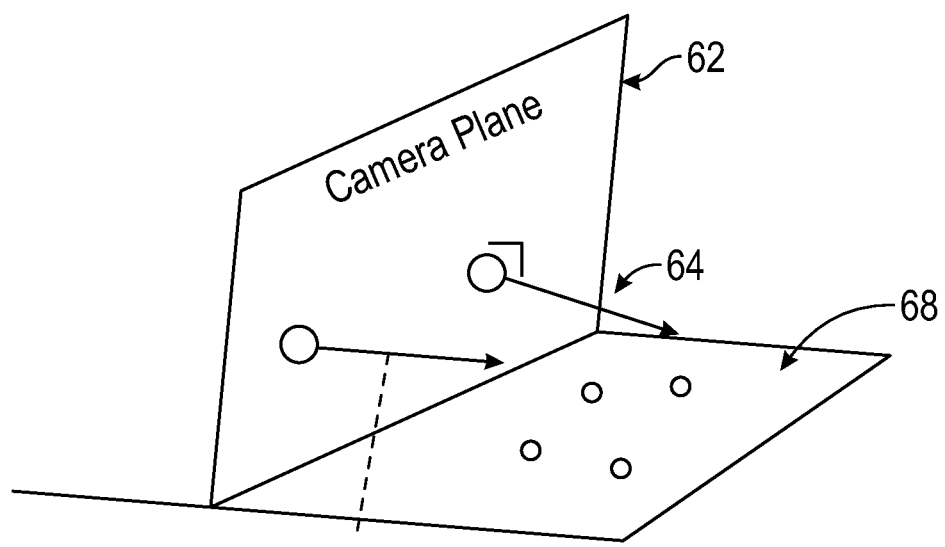
FIG. 6 is a schematic view of a plane of a vehicle mounted camera.

Referring to FIG. 6, those points within the region of interest 58 that are part of the ground are filtered out to reduce unnecessary processing efforts. Relative movement between the vehicle 22 and trailer 24 occurs substantially in a direction 64 that is normal to the plane of the camera 62 as is indicated in FIG. 6. Movement of the vehicle 22 toward the trailer 24 is indicated by changes in distance between the position of the coupler 26 and the camera plane 62.

Once the ground points 68 are filtered from the region of interest 58, the system 20 identifies the coupler 26 as the portion of the depth map that represent objects and feature that are closest to the vehicle 22. The points that are closest to the vehicle 22 that are part of the trailer 24 will be the coupler 26. Those points are identified and labeled as the coupler 26 and then tracked to align the hitch 28 to the coupler 26.

Once the coupler 26 is identified, the vehicle navigation system 48 creates a path to align the hitch 28 with the coupler 26 of the trailer 24. The navigation system 48 may also tack the region of interest 58 automatically such that only those points within the depth map 72 that are indicative of a distance between the vehicle 22 and the coupler 26 are tracked. The vehicle navigation system 48 will define the path to decrease the lateral and longitudinal distance between the hitch 28 and coupler 26. The resulting path generated by the navigation system 48 provides a substantially direct and straight path.

The navigation system 48 may also create a path to align the hitch 28 and coupler and not further track the hitch 28. The tow vehicle 22 simply moves along the created path until the hitch 28 reaches the coupler 26. An end point that provides the desired alignment may be preselected and/or automatically set by the navigation system 48.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A method of locating and tracking a trailer coupler for autonomous vehicle operation, the method comprising:
    converting, by a processor, an image from a vehicle camera to a depth map, wherein the depth map includes a plurality of points indicative of a distance between a plurality of objects within the image and a reference point;
    identifying at least one object of the plurality of objects in the depth map having a smallest distance to the reference point;
    identifying, by the processor, a coupler of a trailer as corresponding to the at least one object having the smallest distance to the reference point; and
    determining, by the processor, a position of the identified coupler and communicating, by the processor, the position of the identified coupler to a vehicle driving control system,
    wherein the vehicle camera comprises a single monocular camera.

2. The method as recited in claim 1, further comprising selecting a region of interest in the image from the vehicle camera, wherein the identified objects in the depth map are located within the selected region of interest.

3. The method as recited in claim 2, wherein the region of interest is smaller than the image from the vehicle camera and includes the trailer coupler.

4. The method as recited in claim 2, wherein the region of interest is selected automatically by an algorithm executed by a controller within the vehicle.

5. The method as recited in claim 1, further comprising removing, by the processor, points in the region of interest of the depth map that are indicative of a ground surface.

6. The method as recited in claim 1, further comprising determining a path toward the coupler based on the depth map.

7. The method as recited in claim 1, further comprising determining, by the processor, a pose of the camera based on information from at least one sensor system within the vehicle that is indicative of movement of the vehicle.

8. The method as recited in claim 7, further comprising generating, by the processor, a dynamical model of vehicle movement based on information from the at least one sensors system of the vehicle and determining, by the processor, the pose of the camera based on the dynamical model.

9. The method as recited in claim 8, wherein the at least one sensor system comprises at least one of an acceleration sensor, a wheel angle sensor, an inertial measurement unit, or a global positioning system.

10. The method as recited in claim 1, further comprising creating, by the processor, the depth map in real time with a controller within the vehicle, wherein the processor forms at least part of the controller.

11. An autonomous vehicle system for locating and tracking a trailer coupler comprising:
a controller comprising a processor configured to:
convert, by the processor, an image from a single vehicle monocular camera to a depth map, wherein the depth map includes a plurality of points, each point indicative of a distance between an object within the depth map corresponding to the point and a reference point, the depth map includes a plurality of objects;
identify, by the processor, at least one object of the plurality of objects having the smallest distance to the reference point;
identify, by the processor, a coupler of a trailer as corresponding to points in the depth map that are closest to the reference point; and
determine, by the processor, a position of the identified coupler and communicate, by the processor, the position of the identified coupler to a vehicle driving control system.

12. The autonomous vehicle system as recited in claim 11, wherein the controller processor is further configured to remove points indicative of the ground from the depth map.

13. The autonomous vehicle system as recited in claim 12, further comprising a selecting means for selecting a region of interest in an image from the vehicle camera.

14. The autonomous vehicle system as recited in claim 13, further comprising at least one sensor system of the vehicle and the controller processor is further configured to determine a pose of the camera based on information indicative of vehicle odometry provided by the at least one sensor system.

15. The autonomous vehicle system as recited in claim 14, further comprising a path generation system in communication with the controller, the path generation system creating a path for the vehicle toward the coupler.

16. A non-transitory computer readable medium comprising instructions executable by a controller processor for locating and tracking a trailer coupler, the instructions comprising:
instructions prompting a controller processor to convert an image from a single vehicle monocular camera to a depth map, wherein the depth map includes a plurality of points indicative of a distance between a plurality of objects within the image and a reference point;
instructions prompting the controller processor to identify at least one object of the plurality of objects in the depth map having a smallest distance to the reference point;
instructions prompting the controller processor to identify a coupler of a trailer as corresponding to the at least one object having the smallest distance to the reference point; and
instructions prompting the controller to determine a position of the identified coupler and communicate the position of the identified coupler to a vehicle driving control system.

17. The non-transitory computer readable medium as recited in claim 16, further comprising instructions for selecting a region of interest within an image from the vehicle camera, wherein the plurality of objects in the depth map are within the selected region.

* * * * *